United States Patent [19]

Omura et al.

[11] Patent Number: 4,845,917

[45] Date of Patent: Jul. 11, 1989

[54] SYSTEM FOR PROCESSING PAPER SHEETS

[75] Inventors: Hideo Omura, Tokyo; Toshiyuki Miyano, Yokohama, both of Japan

[73] Assignee: Kabushiki Kaisha Toshiba, Kawasaki, Japan

[21] Appl. No.: 107,504

[22] Filed: Oct. 13, 1987

[30] Foreign Application Priority Data

| | | | |
|---|---|---|---|
| Oct. 14, 1986 | [JP] | Japan | 61-243507 |
| Oct. 14, 1986 | [JP] | Japan | 61-243508 |
| Oct. 14, 1986 | [JP] | Japan | 61-243509 |
| Oct. 14, 1986 | [JP] | Japan | 61-243510 |

[51] Int. Cl.⁴ ........................ B23P 19/00; B65B 27/08

[52] U.S. Cl. ........................................ 53/53; 53/492; 53/587; 209/534

[58] Field of Search ..................... 53/53, 54, 500, 498, 53/582, 587, 492, 435, 520; 209/534

[56] References Cited

U.S. PATENT DOCUMENTS

| | | | |
|---|---|---|---|
| 3,499,555 | 3/1970 | Wahle . | |
| 3,932,272 | 1/1976 | Carnes, Jr. et al. | 209/534 |
| 4,414,730 | 11/1983 | Ohmura et al. | 209/534 X |
| 4,586,232 | 5/1986 | Ohmura et al. | 209/534 X |
| 4,660,818 | 4/1987 | Conner et al. | 209/534 X |
| 4,722,443 | 2/1988 | Maruyama et al. | 209/534 |

FOREIGN PATENT DOCUMENTS

| | | |
|---|---|---|
| 1554500 | 4/1970 | Fed. Rep. of Germany . |
| 3144820 | 11/1982 | Fed. Rep. of Germany . |
| 3337463 | 4/1984 | Fed. Rep. of Germany . |

*Primary Examiner*—James F. Coan

*Attorney, Agent, or Firm*—Cushman, Darby & Cushman

[57] ABSTRACT

A banknote processing system includes a handling apparatus, a convey mechanism, and a plurality of inspecting apparatuses. The handling apparatus has an input portion on which a predetermined number of bundles of banknotes are placed. The bundles are taken out one by one from the input portion by a take-out device and are transferred to the inspecting apparatus by the convey mechanism. In the inspecting apparatus, the banknotes are picked up one by one from the bundles, so as to be inspected. The inspected banknotes are banded to form inspected bundles and are discharged from the inspecting apparatus. The discharged bundles are then transferred by the convey mechanism, and stacked on a stacking portion of the handling apparatus by a take-in device.

30 Claims, 13 Drawing Sheets

SYSTEM FOR PROCESSING PAPER SHEETS

BACKGROUND OF THE INVENTION

The present invention relates to a processing system for automatically conveying paper sheets, e.g., a bundle of bills which are banded by a bundling strip, to an inspecting apparatus and then processing the bundle.

A bundle processing system, i.e., a banknote processing system has been proposed, in which packs of banknotes such as bills are inserted in an inspecting apparatus incorporated in the system, and the packing strip holding each pack is automatically removed, and the banknotes picked up one by one. Thereafter, the banknotes are inspected, and are sorted and stacked, based on the inspection results.

More specifically, banknotes are banded into packs each consisting of 100 banknotes by use of packing strips such as paper bands, with 10 packs of banknotes then being banded into a bundle by use of bundling strips. When such a bundle is inserted into the processing system, the bundling strip is cut by a cutter incorporated in a preprocessing unit, for it to be unbundled into 10 separate packs. Thereafter, the packing strips are cut, and 100 banknotes (an open pack) are conveyed, at one time, to an unbanded banknote pickup unit, by a paper sheet supply unit, while the notes remain loosely stacked. The unbanded banknote pickup unit continuously picks up the banknotes supplied to it by the supply unit, one by one, starting with the uppermost banknote, and conveys them to the inspecting apparatus. In the inspecting apparatus, each banknote is subjected to inspection to check for "damage" or "authenticity", and is subsequently stacked in a predetermined stacker, in accordance with the inspection result. The stacked banknotes are again banded into packs in units of 100 banknotes, and 10 packs of banknotes are then banded into a bundle, and the bundle discharged from the inspecting apparatus.

However, conventionally, bundles of bills are inserted manually into the inspecting apparatus by an operator, who also removes the bundling strip. The inspected bundles discharged from the inspecting apparatus are conveyed manually, again by the operator, from the inspecting apparatus to a predetermined stacking place. Thus, the operator must remove the bundling strip, insert the packs into and take them from the inspecting apparatus, which is inefficient as regards work performance.

SUMMARY OF THE INVENTION

The present invention has been developed in consideration of the above situation and has as its object to provide a paper sheet processing system which can process paper sheets more efficiently than the conventional apparatus.

In order to achieve the above object, the processing system of the present invention comprises: an input portion on which a predetermined number of bundles are placed, each bundle being prepared by banding a predetermined number of packs, and each pack being prepared by banding a predetermined number of paper sheets; take-out means for taking out the bundles placed on the input portion one by one; conveying means for receiving the bundle from the take-out means and conveying the bundle in a predetermined direction; and an inspecting apparatus for receiving the bundle from the conveying means and picking up the paper sheets one by one from the bundle, to inspect the paper sheets.

BRIEF DESCRIPTION OF THE DRAWINGS

FIGS. 1 to 14B show a processing system according to an embodiment of the present invention, in which:

FIG. 1 is a perspective view showing the overall system;

FIG. 2 is a perspective view schematically showing a handling apparatus;

FIG. 3 is a perspective view showing an input portion;

FIG. 4 is a perspective view showing part of a take-out device;

FIG. 5 is a perspective view showing a conveyor of the take-out device;

FIG. 6 is a perspective view schematically showing a rejecting mechanism;

FIG. 7 is a perspective view schematically showing substantially the overall convey mechanism;

FIG. 8 is a perspective view showing a part of the convey mechanism and a take-in mechanism of an inspecting apparatus;

FIG. 9 is a sectional view taken along line IX—IX of FIG. 1;

FIG. 10 is a perspective view schematically showing a part of the convey mechanism on the delivery side and a sealing mechanism;

FIG. 11. is a perspective view showing part of a stacking portion;

FIG. 12 is a side view showing the overall inspecting apparatus;

FIGS. 14A and 14B collectively show a flow chart showing the operation of the system.

DETAILED DESCRIPTION OF THE PREFERRED EMBODIMENT

An embodiment of the present invention will now be described in detail with reference to the accompanying drawings.

Figure 1:
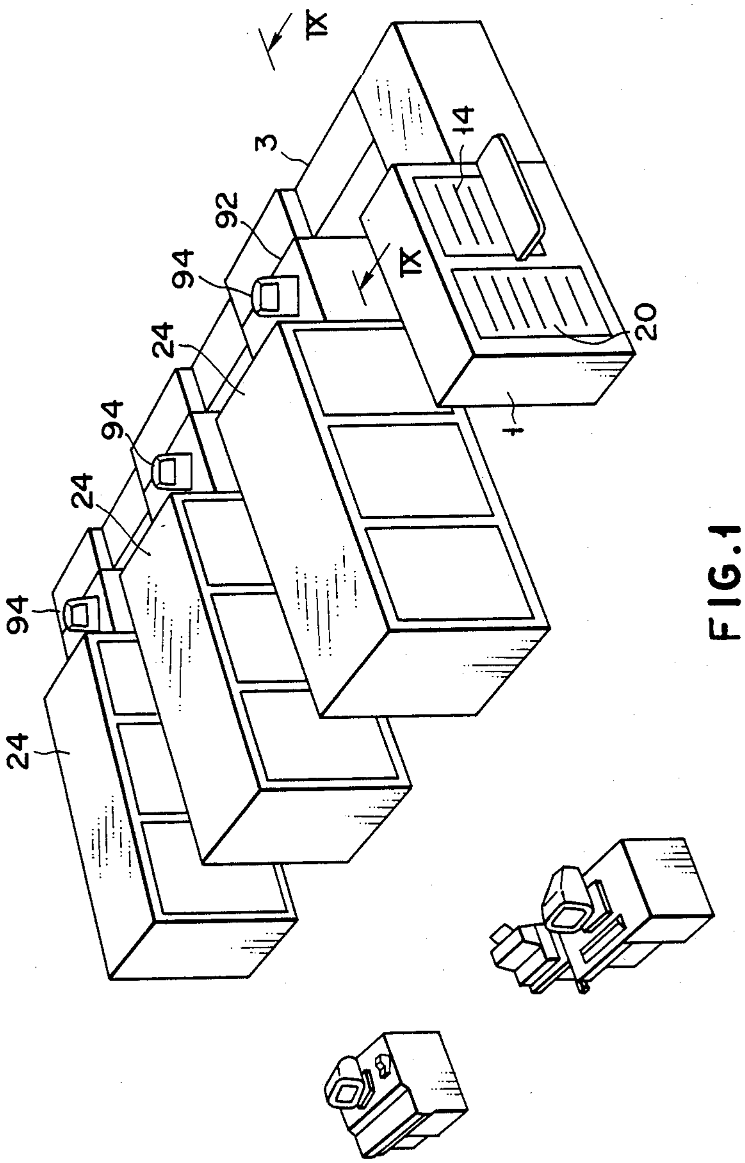

FIG. 1 shows a banknote processing system according to an embodiment of the present invention. This system comprises handling apparatus 1, convey mechanism 3 extending from the handling apparatus, and a plurality of inspecting apparatuses 24 arranged along the convey mechanism.

Handling apparatus 1 will be briefly described. As is shown in FIG. 2, handling apparatus 1 comprises insertion table 14 as an input portion in which uninspected bundles of banknotes are inserted, take-out device 15, take-in device 13, first and second 10-pack counters **16*a* and 16*b*, inserted bundle rejecting device 17, inspected bundle reject device 18, sealing device 19, reception table 20 as a stacking portion for receiving inspected bundles, operation panel 21, and controller 22**.

Figure 2:
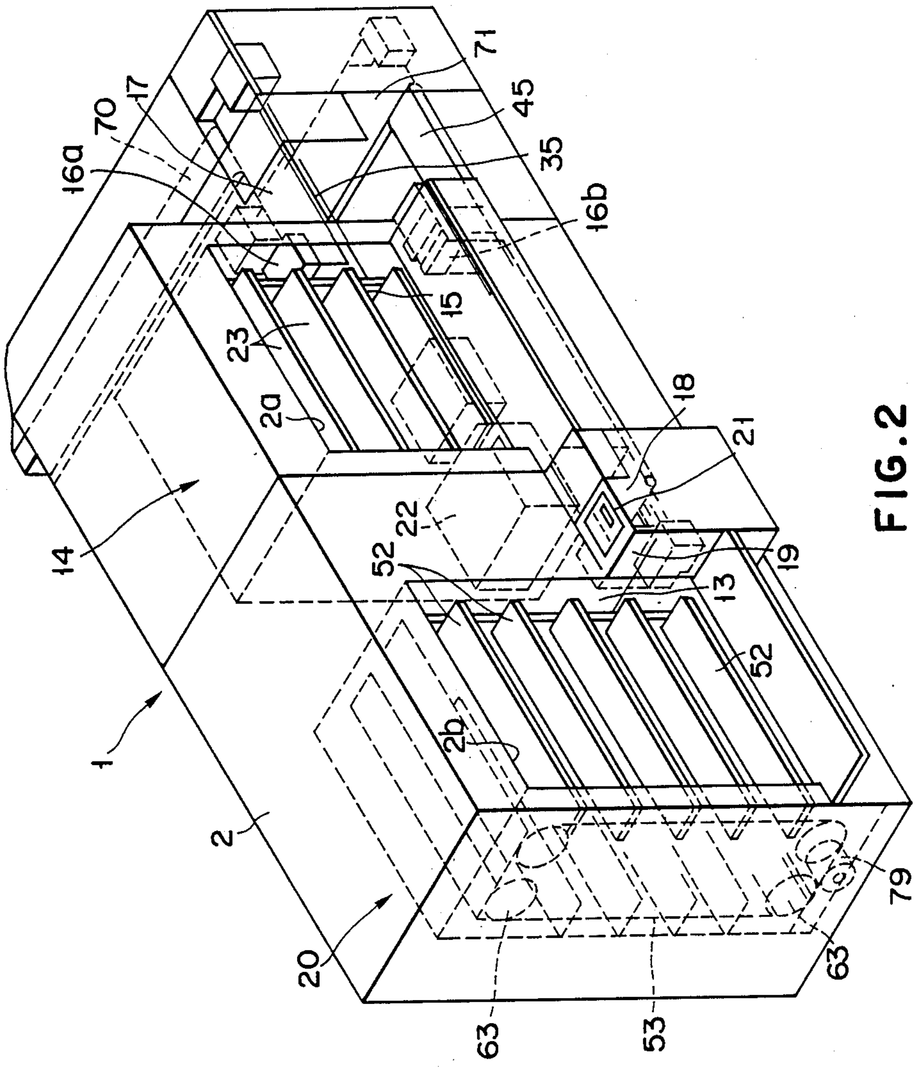
Figure 3:
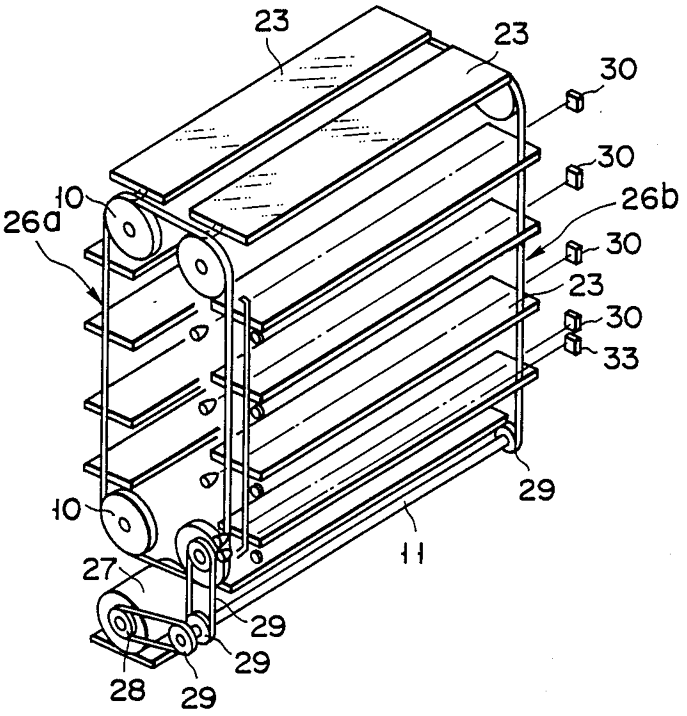
Figure 4:
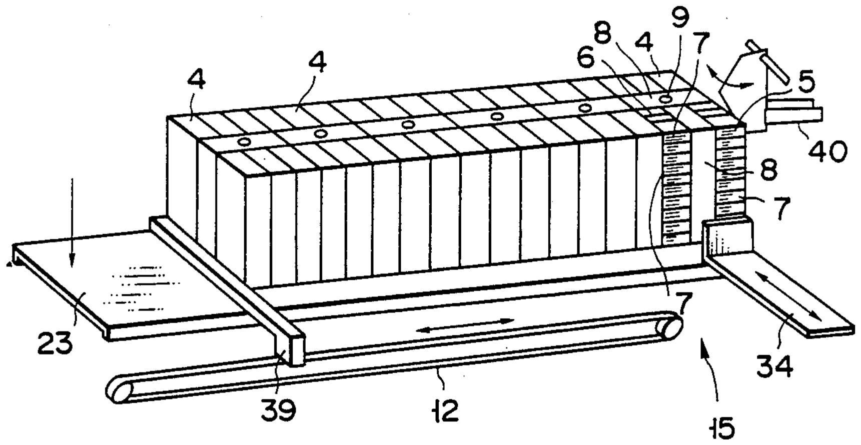

As is shown in FIGS. 2 and 3, insertion table 14 is arranged in casing 2 of handling apparatus 1, and has a plurality of horizontal shelves 23. Bundles 4 of banknotes inserted from insertion port **2*a* of casing 2 by an operator are placed on these shelves 23. A maximum of 10 bundles can be placed on one shelf. Note that in each bundle 4, 100 banknotes 5 are banded by packing strip 6 into pack 7, and 10 packs of banknotes are cross-banded by two bundling strips 8 into a bundle, as is shown in FIG. 4. Branch seal 9 of a bank is sealed on the crossing portion of bundling strips 8. Note that packing strip 6 is deviated from the center of pack 7 without completely overlapping bundling strip 8** to be externally observed.

The two end portions of each shelf 23 are respectively coupled to a pair of endless chains 26*a* and 26*b*. Each chain is looped around four sprockets, and is moved along a substantially rectangular path. When two sprockets 10 are driven by motor 27 through a plurality of pulleys 28, belt 29, and coupling rod 11, chains 26*a* and 26*b* are moved. Insertion table 14 is designed such that four shelves 23 always face insertion port 2*a*. Therefore, a maximum of 40 bundles 4 can be stacked. Note that each bundle 4 is placed on shelf 23 so that branch seal 9 faces upward, and packing strip 6 is located on the side of insertion port 2*a*. Four sensors 30 for detecting the presence/absence of bundles 4 on the shelves along the horizontal direction are provided in correspondence with the positions of four shelves 23 facing insertion port 2*a*. Shelves 23 are automatically moved or stopped in accordance with the detection results from sensors 30. More specifically, when no bundle 4 is placed on front four shelves 23 at all, movement of the shelves is stopped, and an alarm sound is generated to signal a shortage of bundles to an operator. When sensor 30 detects that lowermost shelf 23 is empty, the shelves are moved downward by one step.

As is shown in FIG. 3, monitor sensor 33 is provided in addition to sensors 30 in correspondence with the position of lowermost shelf 30. Sensor 33 emits a detection beam along the horizontal direction. When the detection beam is shielded, e.g., when an operator inserts his hand inside casing 2 from insertion port 2*a* in order to place bundle 4 on shelf 23, the movement of shelf 23 is immediately stopped. Thus, accidents such that an operator's hand is clamped between shelves 23, can be prevented, thus guaranteeing safety of the operator.

Take-out device 15 for taking out bundles 4 from insertion table 14 is arranged as is shown in FIGS. 4 to 7.

Figure 5:
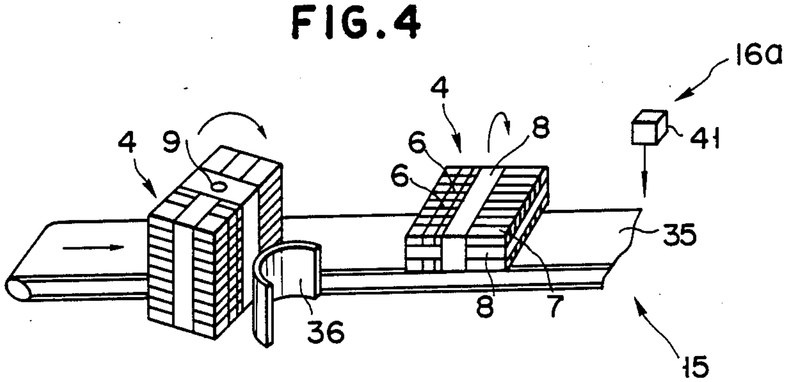

Bundles 4 are taken out at the right end portion of lowermost shelf 23. Take-out device 15 has transfer arm 39 for moving bundles 4 toward the right end portion of the shelf, and sensor 40 for detecting that a bundle to be taken out has reached the right end of the shelf. The movement of transfer arm 39 is stopped in response to a signal from sensor 40. Arm 39 is horizontally moved on shelf 23 by adjacent belt 12. When shelves 23 are to be moved, arm 39 is pivoted so as not to interfere with movement of the shelves. Take-out device 15 has conveyor 35 arranged behind lowermost shelf 23 to be parallel thereto, and push-out arm 34 for pushing out bundles on shelf 23 toward the conveyor. When the rightmost bundle 4 is pushed by arm 34, the distal end portion of bundle 4 contacting conveyor 35 begins to move to the right in accordance with the movement of conveyor 35, and right movement of the rear end portion of the bundle is temporarily restricted by curved guide plate 36 arranged between shelf 23 and conveyor 35, as is shown in FIG. 5. For this reason, bundle 4 is rotated clockwise, and is transferred onto conveyor 35 in a state wherein the bundle is rotated through 90 degrees. The upper end portion of bundle 4 placed on conveyor 35 is pushed inwardly by a register (not shown) and is layed down. Bundle 4 in this state is conveyed to insertion side conveyor 70 of convey mechanism 3 (to be described later) through 10-pack counter 16*a* on the insertion side and bundle rejecting device 17.

Note that when rightmost bundle 4 on shelf 23 is pushed out by arm 34 and arm 34 is returned to the home position, bundles left on the shelf are moved to the right by transfer arm 39. When next bundle 4 has reached the right end of shelf 23 and abuts against sensor 40, the movement of arm 39 is stopped in response to a signal from sensor 40.

10-pack counter 16*a* comprises scanner 41 arranged above an intermediate portion of the convey path of conveyor 35. Scanner 41 irradiates conveying bundle 4 with light to scan the bundle in a direction perpendicular to the convey direction. Scanner 41 detects boundaries of packing strips 6 by utilizing light reflected by bundle 4, and hence, detects the number of packs 7 of each bundle 4 based on the number of boundaries.

Figure 6:
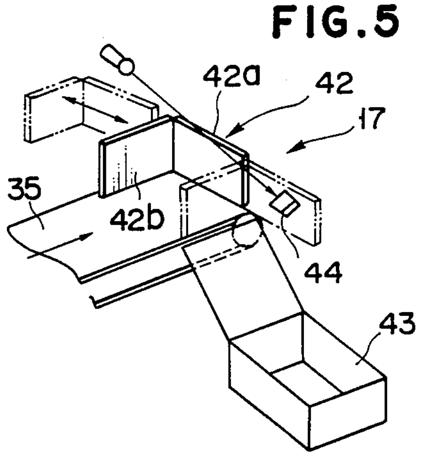

Insertion-side bundle rejecting device 17 is arranged at the rear end portion of conveyor 35, and rejects an abnormal bundle 4, the abnormality of which is detected by 10-pack counter 16*a*, i.e., a bundle, the number of packs of which is other than 10. Rejecting device 17 has rejected bundle stacking box 43 arranged beside the rear end portion of conveyor 35, bundle stop/reject arm 42 which can be freely advanced or retreated along a direction perpendicular to the traveling direction of conveyor 35, and sensor 44 for detecting arrival of bundle 4, as is shown in FIG. 6. When an abnormality of bundle 4 is detected by 10-pack counter 16*a*, an abnormality signal is supplied from controller 22 to rejecting device 17, and arm 42 is advanced until its front wall 42*a* is located on the moving path of conveyor 35. Abnormal bundle 4 conveyed by conveyor 35 abuts against front wall 42*a*, and is stopped at the rear end of the conveyor. When sensor 44 detects that abnormal bundle 4 has reached the rear end of conveyor 35, arm 42 is further moved forward, and bundle 4 is pushed into removal box 43 from conveyor 35 by side wall 42*b* of arm 42. Thereafter, arm 42 is returned to a standby position so as not to interfere with travel of bundle 4.

When 10-pack counter 16*a* detects that bundle 4 has 10-packs, rejecting device 17 is not operated. For this reason, bundle 4 passes through rejecting device 17, and is conveyed to convey mechanism 3.

Figure 7:
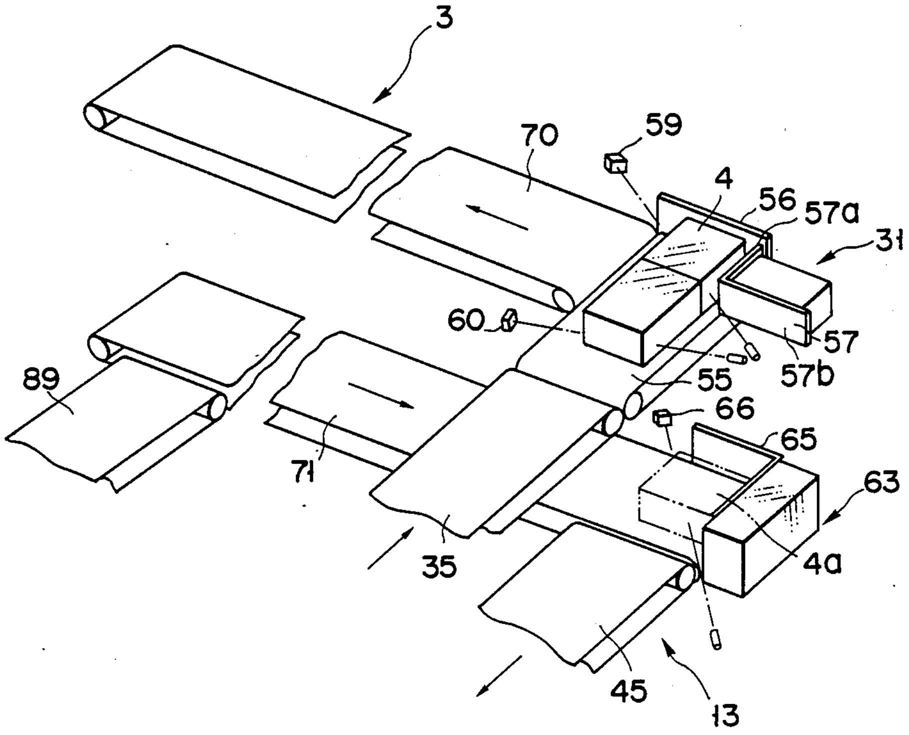
Figure 8:
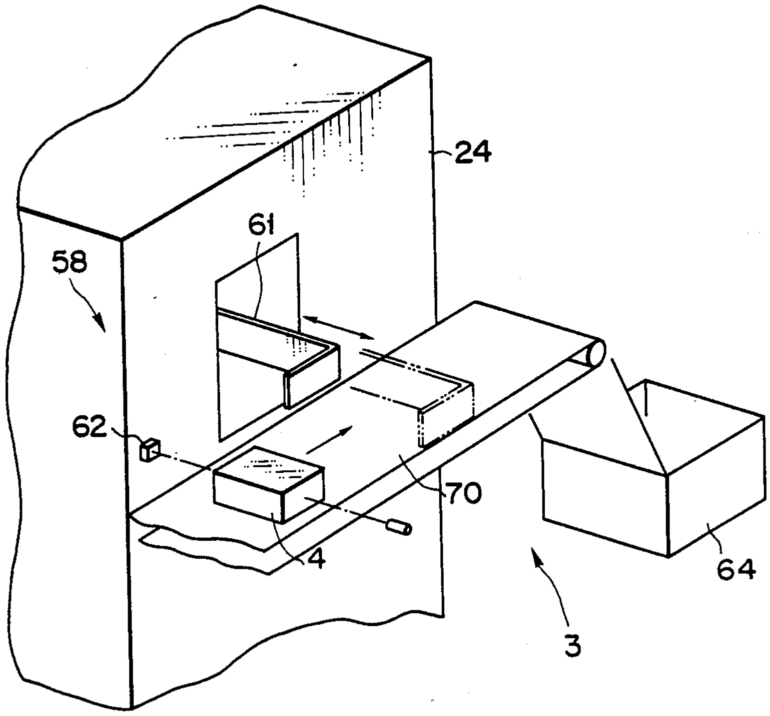
Figure 9:
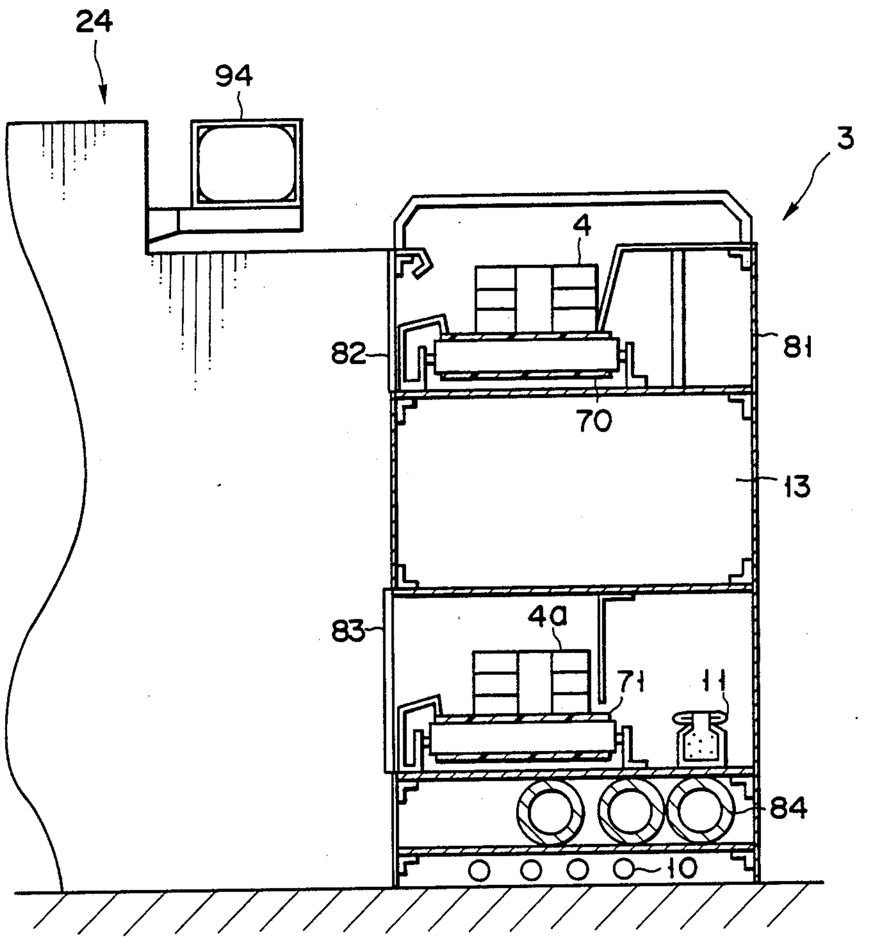

Convey mechanism 3 is arranged as is shown in FIGS. 7 to 9. More specifically, convey mechanism 3 has buffer conveyor 55, arranged continuously with conveyor 35, for receiving bundle 4 conveyed from conveyor 35, insertion conveyor 70 extending from the rear end portion of conveyor 55 to inspecting apparatus 24 perpendicular to conveyor 55, and push-out device 31 for pushing out bundle 4 from conveyor 55 to conveyor 70. Bundle 4 transferred from conveyor 35 to conveyor 55 abuts against stop plate 56 standing at the rear end of conveyor 55, and is stopped on conveyor 55. The length of conveyor 55 is designed so that two bundles 4 can be placed thereon. The second bundle abuts against the rear end of the first bundle, and is stopped on conveyor 55. Sensors 59 and 60 respectively detect the presence/absence of first and second bundles 4 on conveyor 55. In this embodiment, conveyor 55 is designed to place two bundles 4 thereon. However, the number of bundles to be placed on the conveyor may be increased as needed.

Push-out device 31 has push-out plate 57 which is arranged to be freely advanced or retreated along a direction perpendicular to the transfer direction of conveyor 55. Push-out plate 57 is formed into an L shape by front wall 57*a* and side wall 57*b*. Plate 57 is advanced in accordance with a bundle take-out signal from inspecting apparatus 24, and pushes first bundle 4 on conveyor 55 onto conveyor 70 by front wall 57*a*. During the push-out operation, second bundle 4 on conveyor 55 abuts against side wall 57*b* of plate 57 and its movement is restricted thereby. When plate 57 is returned to an initial position shown in FIG. 7, second bundle 4 is conveyed by conveyor 55, is stopped at stop plate 56, and awaits the next take-out signal from inspecting apparatus 24. If sensor 59 and/or 60 detects the absence of first and/or second bundle 4, push-out arm 34 (FIG. 4) of take-out device 15 is operated by controller 22, and next bundle 4 is taken out from insertion table 14.

As is shown in FIG. 8, bundle 4 pushed onto conveyor 70 is conveyed near inspecting apparatus 24 by conveyor 70, and is taken inside the inspecting apparatus by take-in unit 58 of the inspecting apparatus. Take-in unit 58 has bundle take-in arm 61, which can be freely advanced or retreated into or from the moving path of conveyor 70, and sensor 62 arranged before inspecting apparatus 24 and adjacent to conveyor 70. When bundle 4 on conveyor 70 is detected by sensor 62, take-in arm 61 is operated to take the bundle inside inspecting apparatus 24. Convey mechanism 3 also has reject box 64. When take-in arm 61 fails to take in bundle 4 on conveyor 70, the bundle is dropped from the rear end portion of conveyor 70 and is stacked in removal box 64.

As is shown in FIGS. 7 and 9, convey mechanism 3 comprises conveyor 71 for receiving and conveying inspected bundle 4*a* delivered from each inspecting apparatus 24 (to be described later). Conveyor 71 is arranged below conveyor 70 and extends parallel thereto. These conveyors 70 and 71 are located inside housing 81. Open/close doors 82 and 83 are respectively arranged on those portions of the side wall of housing 81 which are located between the adjacent inspecting apparatuses 24. If convey mechanism 3 is stopped due to breakdown, uninspected bundle 4 and inspected bundle 4*a* are taken out from housing 81 through doors 82 and 83, respectively. In housing 81 are arranged exhaust duct 13, for removing exhaust heat from handling apparatus 1 and inspecting apparatuses 24, 24; signal cables 11, for connecting handling apparatus 1 and inspecting apparatuses 7; power supply cables 10, and ventilating pipes 84.

As is shown in FIG. , push-out device 63 for pushing out inspected bundle 4*a* onto inspected bundle conveyor 45 of take-in device 13 (to be described later) is arranged at the rear end in the convey direction of conveyor 71. Device 63 has sensor 66 for detecting arrival of bundle 4*a* at the rear end of conveyor 71, and push-out plate 65 for pushing out bundle 4*a* onto conveyor 45 in accordance with a signal from sensor 66.

Figure 10:
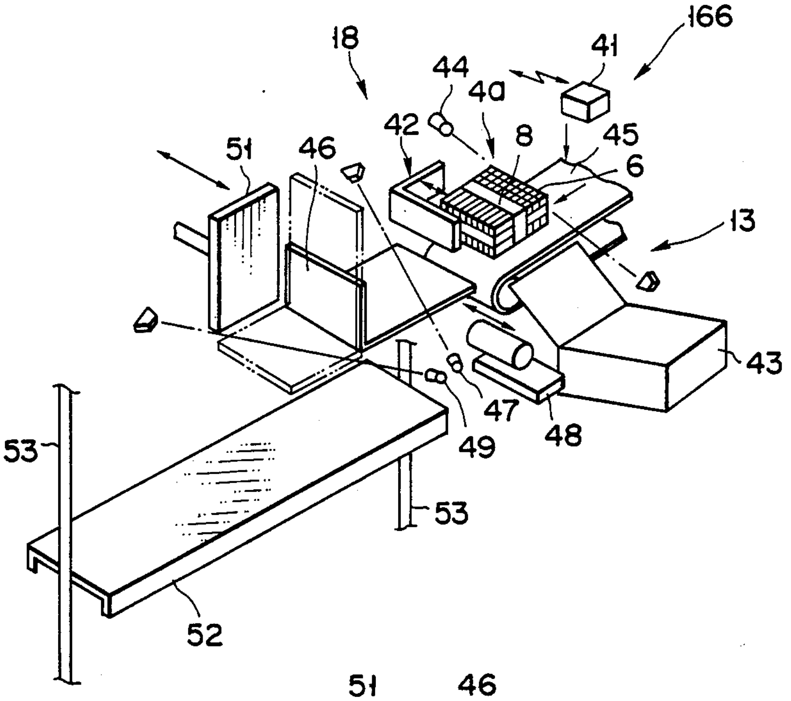
Figure 11:
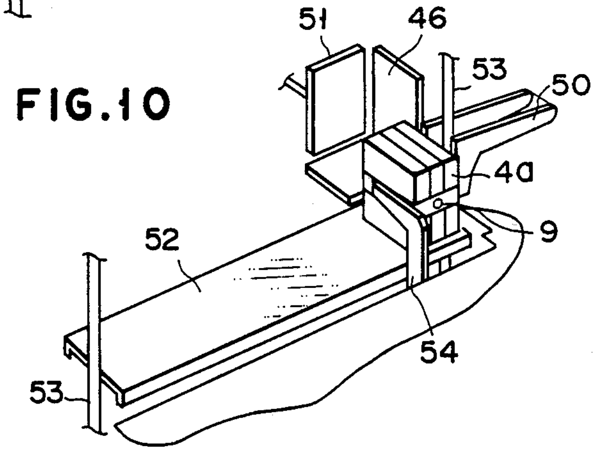

Conveyor 45 extends from the rear end of conveyor 71 to a portion adjacent to reception table 20 of apparatus 1 to be perpendicular thereto. As is shown in FIGS. 10 and 11, reception side 10-pack counter 16*b* and reception side reject device 18 are sequentially arranged at the rear end portion in the convey direction of conveyor 45. Counter 16*b* has scanner 41, and reject device 18 has bundle stop/reject arm 42, sensor 44, and reject box 43. Since the operation and structure of counter 16*b* and device 18 are the same as those of counter 16*a* and device 17 on the insertion side, a description thereof will be omitted. Take-in device 13 further comprises L-shaped turntable 46 for receiving inspected or normal bundle 4*a* passing through removal device 18, and sealing device 48 for sealing a branch seal of a bank on the bundle on the turntable. When bundle 4*a* on turntable 46 is detected by sensor 47, seal 9 is stamped on the cross portion of bundling strips 8 of bundle 4*a* by sealing device 48, and then, turntable 46 is pivoted through about 90 degrees from an initial position indicated by the solid line to a pivot position indicated by the two dots and dash line. When bundle 4*a* on turntable 46 at the pivot position is detected by sensor 49, bundle 4*a* is pushed from the turntable onto shelf 52 of reception table 20 (to be described later) by push-out plate 51 provided beside the turntable. After bundle 4*a* is transferred on shelf 52, push-out plate 51, turntable 46, and sealing device 48 are returned to their initial positions indicated by solid lines in FIG. 10.

As is shown in FIGS. 2, 10, and 11, reception table 20 is arranged inside casing 2 of apparatus 1 to be adjacent to insertion table 14. Reception table 20 has a plurality of shelves 52 for stacking inspected and sealed bundles 4*a* thereon. Like shelves 23 of insertion table 14, shelves 52 are movable along a predetermined closed path by a pair of chains 53 and a plurality of sprockets 63, and are driven by motor 79. Table 20 is arranged so that 5 shelves 52 always face take-out port 2*b* formed in casing 2 of apparatus 1. Bundles 4*a* are stacked from the right end of lowermost shelf 52. In this case, each bundle 4*a* is placed on shelf 52 so that branch seal 9 faces take-out port 2*b*.

Bundles 4*a* stacked on shelves 52 are moved by a predetermined distance toward the left end of the shelf by stacking arm 50 arranged at the right end portion of the shelf each time new bundle 4*a* is stacked on the shelf. Holding arm 54 abuts against the left side surface of bundle 4*a* on shelf 52, and is movable along the horizontal direction. Holding arm 54 is moved synchronously with bundle 4*a* in accordance with the take-in operation of stacking arm 50, thus preventing falling down of bundles upon push-in operation. Note that the structure and operation of holding arm 54 are the same as those of transfer arm 39 of insertion table 14 except for its moving direction, and a detailed description thereof will be omitted.

When 10 bundles 4*a* are stacked on lowermost shelf 52, the shelves are moved upward by one step, and an empty shelf is moved to a position facing take-in device 13. The presence/absence of bundles 4*a* on shelves 52 is detected by a plurality of sensors in the same manner as in insertion table 14. When 10 bundles 4*a* are stacked on each of all five shelves 52 facing take-out port 2*b*, movement of reception table 20 is stopped in response to a signal from the sensors, and a buzzer is operated to signal a need for removal of bundles 4*a* on shelves 52 (in particular, bundles on the uppermost shelf) to an operator. Even when only one bundle 4*a* is placed on uppermost shelf 52, a full stacking state is decided when 10 bundles 4*a* are stacked on the lowermost shelf, regardless of the stacking states of the other shelves. Then, the movement of table 20 is stopped, and alarming by the buzzer is performed.

Figure 12:
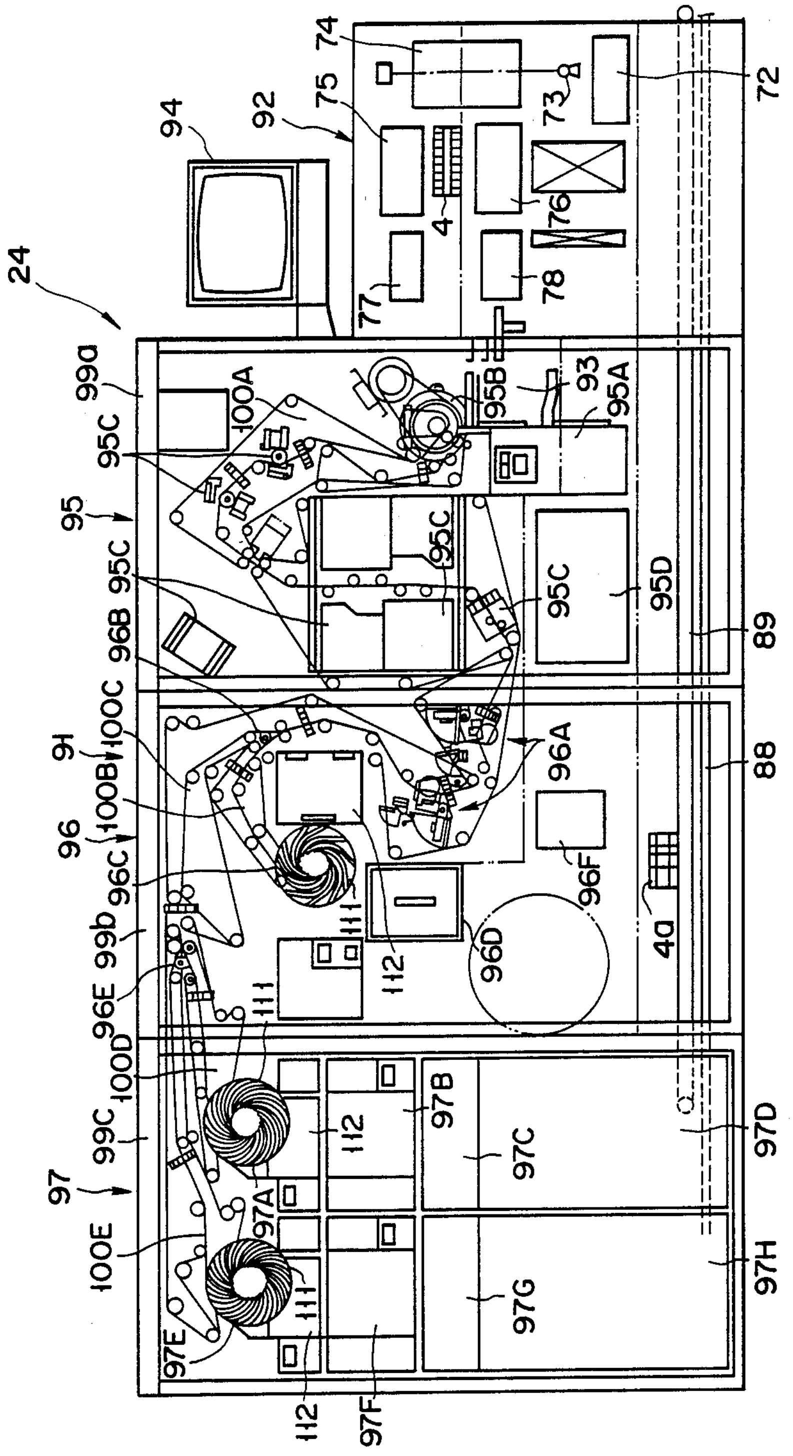

Inspecting apparatuses 24 will be described with reference to FIG. 12.

Each inspecting apparatus 24 comprises apparatus body 91, preprocessing device 92 for feeding bundles 4 to body 91, unbanded banknote insertion device 93 for allowing an operator to manually insert an arbitrary number of unbanded banknotes into body 91 independently from device 92, main controller 72 for controlling operations of these devices, and operation display unit 94 for executing a control instruction of controller 72.

Preprocessing device 92 comprises take-in unit 58 (FIG. 8), having take-in arm 61 described above, for taking uninspected bundles 4 from conveyor 70, and sensor 73 for detecting that the bundle is taken into the preprocessing device. In response to a detection signal from sensor 73, main controller 72 supplies a take-out signal for taking out the next bundle to controller 22 of handling apparatus 1. Preprocessing device 92 has supply unit 74 for supplying taken bundles 4 to body 91, bundling strip cutter 75 for cutting bundling strips 8 of the bundle, bundling strip cassette 76 for storing the removed bundling strips, packing strip cutter 77 for cutting packing strips of the packs, and packing strip cassette 78 for storing the removed packing strips.

Body 91 mainly comprises pickup/detection module 95 having pickup device 95B for picking up banknotes one by one, and detectors 95C having a function for detecting supplied banknotes; removed banknote stacking module 96 for performing processing of rejected banknotes of those conveyed from module 95; and stacking module 97 for performing processing of usable and unusable banknotes. Modules 95, 96, and 97 are respectively covered by casings **99*a*, 99*b*, and 99*c***.

Pickup/detection module 95 includes banknote supply device 95A for receiving and conveying open packs fed from preprocessing device 92 or manually inserted unbanded banknotes, pickup device 95B for picking up banknotes supplied from device 95A one by one, detectors 95C for detecting damage and authenticity of banknotes picked up one by one by device 95B and fed along convey path 100A, and counting the numbers of banknotes for respective detections, and a total number of banknotes, and memory 95D for storing the detection results from detectors 95C.

Rejected banknote stacking module 96 includes detectors 96A for detecting the feature (unverifiable states, e.g., picking in piles, skew, short pitch, and the like) of banknotes fed from module 95 along convey path 100A, memory 96F for storing the detection results from detectors 96A, first sorter 96B for sorting supplied banknotes into rejected banknotes consisting of counterfeited banknotes and unverifiable banknotes, and other banknotes based on the data stored in memories 95D and 96F, rejected banknote stacker 96C for accepting and stacking rejected banknotes sorted by first sorter 96B and transferred through convey path 100B, rejected banknote cassette 96D for automatically storing the rejected banknotes stacked on stacker 96C, and second sorter 96E for sorting banknotes other than the rejected banknotes conveyed from first sorter 96B through convey path 100C into usable and unusable banknotes based on the data stored in memory 95D.

Stacking module 97 includes usable banknote stacker 97A for stacking usable banknotes fed from second sorter 96E through convey path 100D, usable banknote packing device 97B for banding the usable banknotes stacked on stacker 97A by packing strip 6 in units of 100 banknotes, pack checking device 97C for checking the feature (stacking state, banding state, and the like) of banknotes banded by device 97B, and usable banknote bundling device 97D for banding 10 packs of banknotes by bundling strips 8. Module 97 also includes unusable banknote stacker 97E for stacking unusable banknotes sorted by second sorter 96E and fed through convey path 100E. The stacked unusable banknotes are banded by packing strips by unusable banknote packing device 97F in units of 100 banknotes, and the packs of banknotes are stacked on unusable banknote stacker 97G or are disposed by unusable banknote shredder 97H.

Exhaust pipe 88 extending from shredder 97H to ventilating pipe 84 of convey mechanism 3, and delivery conveyor 89 (FIG. 7) extending from bundling device 97D to conveyor 71 of the convey mechanism are arranged in the lower portion of body 91. Pieces shredded by shredder 97H are delivered outside the system through exhaust pipe 88 and ventilating pipe 84. Bundles **4*a* banded by device 97D are conveyed by conveyor 89 to conveyor 71**.

Each of devices 96C, 97A, and 97E has rotary wheel 111, and stacking box 112 for vibrating banknotes fed from wheel 111 one by one to register them and stacking the registered banknotes.

Figure 13A:
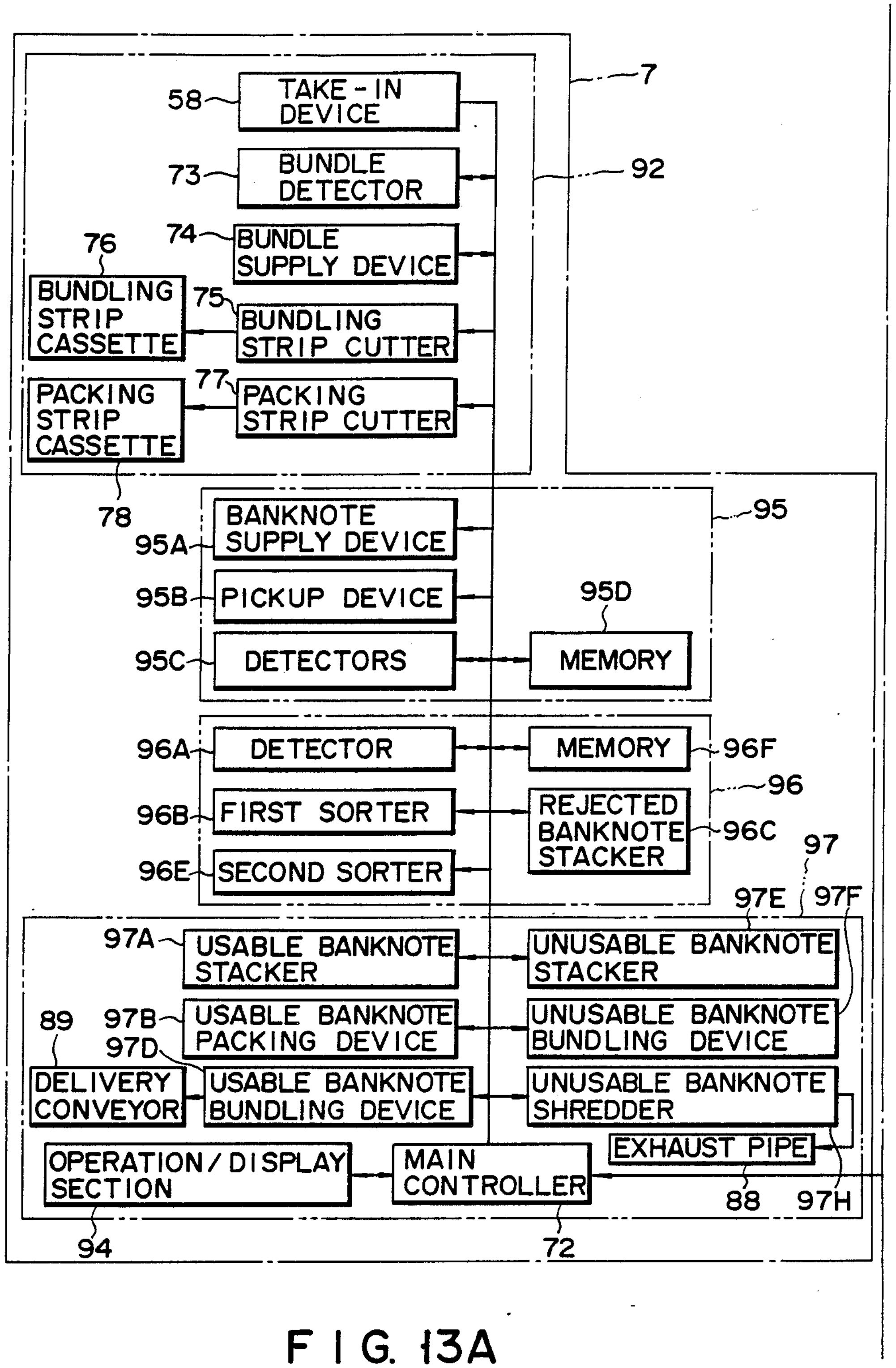
FIGS. 13A and 13B collectively show a block diagram of the system.
Figure 13B:
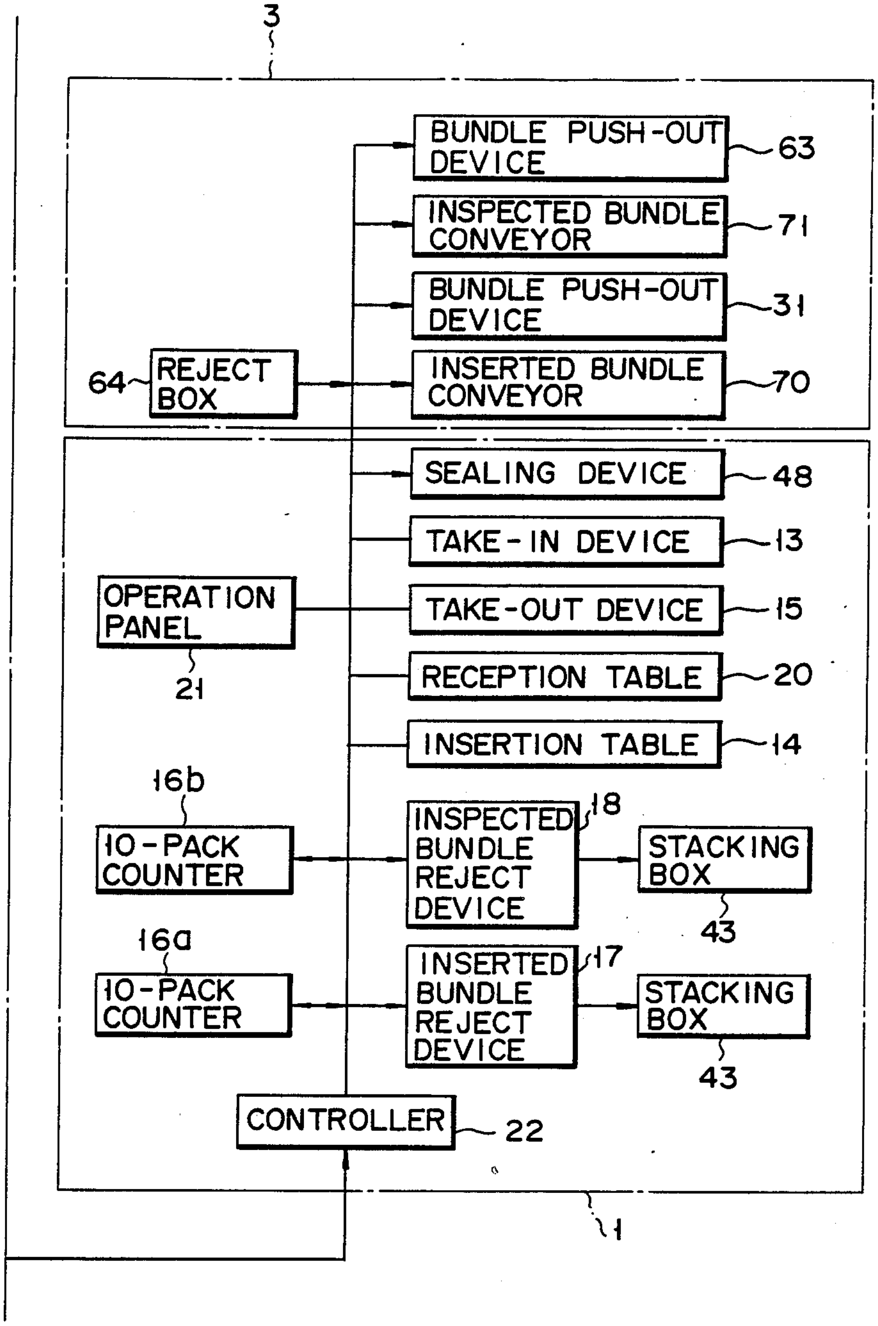

FIGS. 13A and 13B are a block diagram of the system with the above arrangement.

Figure 14A:
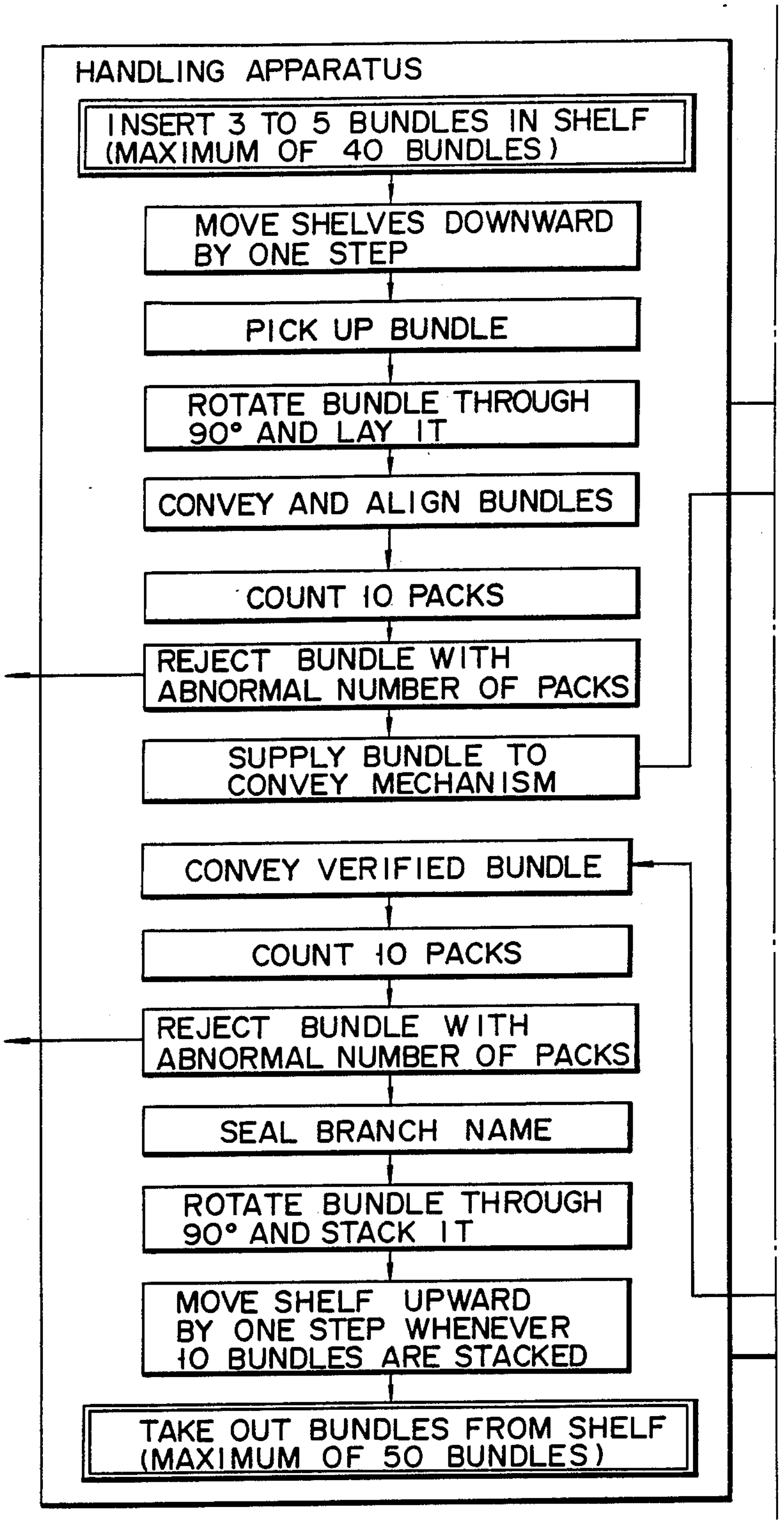
Figure 14B:
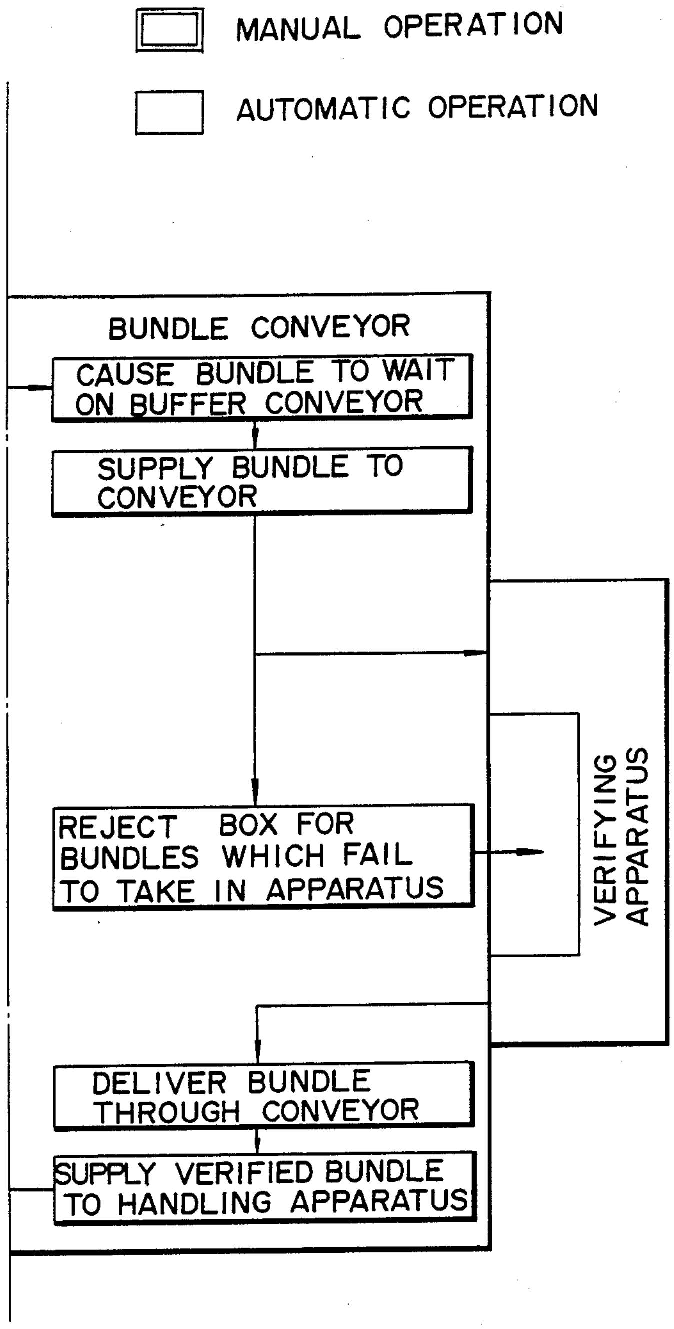

The overall operation of the system upon bundle banding operation will be described with reference to the flow chart shown in FIGS. 14A and 14B.

Three to five bundles 4 are placed on one shelf 23 of insertion table 14 through insertion port **2*a* by an operator. Shelves 23 are moved downward by one step, and bundles 4 are sequentially taken out from lowermost shelf 23. Bundles 4 are then pivoted through 90 degrees and layed down by guide plate 36 to be registered. Thereafter, the number of packs is counted by 10-pack counter 16*a*. Upon this counting, if bundle 4 includes an abnormal number of packs, it is rejected, and if no abnormality is detected, bundle 4 is fed to buffer conveyor 55 of convey mechanism 3. Bundle 4 is conveyed from conveyor 55 to inspecting apparatus 24 through conveyor 70. Note that bundle 4 which fails to be taken in apparatus 24 is rejected into reject box 64, and then inserted in inspecting apparatus 24 by an operator. Bundle 4 fed to inspecting apparatus 24 in this manner is unbundled into unbanded banknotes, and the banknotes are inspected one by one. Thereafter, the banknotes are banded into inspected bundle 4*a* , and the bundle is delivered to conveyor 71. Bundle 4*a* is conveyed to conveyor 45 of handling apparatus 1 through conveyor 71. On conveyor 45, the number of packs of bundle 4*a* is checked by 10-pack counter 16*b*. If an abnormality is found, the corresponding bundle is rejected. If no abnormality is found, a branch name is sealed on the bundle. Thereafter, the bundle is pivoted through 90 degrees, and is placed on shelf 52 of reception table 20. Each time 10 bundles are stacked on shelf 52, shelves 52 are moved upward, and a maximum of 50 bundles are stacked on the shelves. Bundles 4*a* stacked in this manner are taken out from take-out port 2*b*** by an operator.

The banknote processing system with the above arrangement has the following advantages.

After bundles of paper sheets are placed on the insertion table by an operator, these bundles are automatically transferred to the inspecting apparatus. Therefore, an operator need not insert the next bundles each time handling of bundles in the inspecting apparatus is completed. For this reason, handling efficiency of the system can be greatly improved. In particular, if a plurality of inspecting apparatuses are arranged, one operator is necessary for each inspecting apparatus in the conventional system. However, with the system of the present invention, one operator can operate a plurality of inspecting apparatus. Therefore, work capacity per head can be improved. Since bundles are taken out from the insertion table by the take-out device in accordance with a take-out signal from the inspecting apparatus, bundles can be timely supplied to the plurality of inspecting apparatuses.

Bundles inspected by the respective inspecting apparatuses are automatically taken out from the inspecting apparatuses by the convey mechanism and are stacked on the reception table. For this reason, an operator need not go to take inspected bundles each time the operation of the inspecting apparatus is completed, thus improving workability. In particular, since the insertion and reception tables are arranged adjacent to each other, an insertion operation to the insertion table and a take-out operation of bundles from the reception table can be easily performed by one operator. Therefore, work capacity per head can be further improved.

Since the convey mechanism on the insertion side and that on the reception side are housed in the identical housing, the overall size of the system can be reduced, and hence, a large installation space for the system is not necessary.

What is claimed is:

1. A system for processing paper sheets, comprising:

an input portion on which a predetermined number of bundles are placed, each bundle being prepared by banding a predetermined number of packs, and each pack being prepared by banding a predetermined number of paper sheets;

take-out means for taking out the bundles placed on the input portion one by one;

conveying means for receiving the bundles from the take-out means and conveying the bundles in a predetermined direction; and an inspecting apparatus for receiving the bundles from the conveying means and picking up the paper sheets one by one from the bundles, to inspect the paper sheets, said inspecting apparatus including a take-in unit for taking in a bundle from the conveying means, first cutting means for cutting the strips binding the taken-in bundle, second cutting means for cutting the strips binding the packs, a pickup device for picking up paper sheets one by one form the bundle whose strips have been cut, first detection means for detecting damage to and authenticity of the picked-up paper sheets, second detection means for detecting an uninspectable state and an inspectable state with regard to the paper sheets, a first sorter for sorting the paper sheets into inspectable and counterfeited paper sheets and remaining paper sheets, based on the detection results from the first and second detection means, a first stacking device for stacking the uninspectable and counterfeited paper sheets sorted by the first sorter, a second sorter for sorting the remaining paper sheets into usable and unusable paper sheets, based on the detection result from the first detection means, a second stacking device for stacking the usable paper sheets sorted by the second sorter, and a third stacking device for stacking the unusable paper sheets sorted by the second sorter.

2. A system according to claim 1, wherein a plurality of said inspecting apparatuses are arranged along the conveying means.

3. A system according to claim 1, wherein said inspecting apparatus includes instruction means for detecting when a bundle is received, and supplying a take-out instruction to the take-out means, for taking out the next bundle from the input portion.

4. A system for processing paper sheets, comprising:

an input portion on which a predetermined number of bundles are placed, each bundle being prepared by banding a predetermined number of packs, and each pack being prepared by banding a predetermined number of paper sheets;

take-out means for taking out the bundles placed on the input portion one by one, the take-out means including a counter for counting the number of packs of a bundle taken out from the input portion, and rejecting means for rejecting a bundle having a number of packs other than said predetermined number, in accordance with a count result from the counter, the rejecting means having a storage portion for storing the rejected bundle;

conveying means for receiving the bundles from the take-out means and conveying the bundles in a predetermined direction; and an inspecting apparatus for receiving the bundles from the conveying means and picking up the paper sheets one by one from the bundles, to inspect the paper sheets.

5. A system according to claim 4, wherein said take-out means includes a transfer conveyor extending from a portion adjacent to the input portion to the conveying means, a push-out device for pushing out bundles placed on the input portion one by one onto the transfer conveyor, a guide member, arranged between the input portion and the transfer conveyor, for directing, in a predetermined direction, a bundle pushed out onto the transfer conveyor by the push-out device.

6. A system according to claim 4, wherein said counter has a scanner for counting the number of strips of the packs.

7. A system according to claim 4, wherein said conveying means includes a holding device for receiving and holding a bundle from the take-out means, an insertion conveyor extending from the holding unit to a portion adjacent to the inspecting apparatus, and a push-out device for pushing out the bundle held by the holding means onto the insertion conveyor.

8. A system for processing paper sheets, comprising:

an input portion on which a predetermined number of bundles are placed, each bundle being prepared by banding a predetermined number of packs, and each pack being prepared by banding a predetermined number of paper sheets, said input portion including a plurality of horizontal shelves each capable of holding a predetermined number of bundles, and a drive mechanism for moving the shelves along a loop-like path;

take-out means for taking out the bundles placed on the input portion one by one;

conveying means for receiving the bundles from the take-out means and conveying the bundles in a predetermined direction; and an inspection apparatus for receiving the bundles from the conveying means and picking up the paper sheets one by one from the bundles, to inspect the paper sheets.

9. A system according to claim 8, wherein said input portion includes detection means for detecting the presence/absence of the bundle on the shelves and stopping or driving the drive mechanism in accordance with a detection result.

10. A system according to claim 9, wherein said input portion includes accident-preventing means for detecting when an object is inserted between two adjacent shelves and stopping the drive mechanism.

11. A system for processing paper sheets, comprising:
an input portion on which a predetermined number of bundles are placed, each bundle being prepared by banding a predetermined number of packs, and each pack being prepared by banding a predetermined number of paper sheets;
take-out means for taking out the bundles placed on the input portion one by one;
conveying means for receiving the bundles from the take-out means and conveying the bundles in a predetermined direction, said conveying means including a holding device for receiving and holding a bundle from the take-out means, an insertion conveyor extending from the holding device to a portion adjacent to the inspecting apparatus, and a push-out device for pushing out the bundle held by the holding device onto the insertion conveyor; and
an inspecting apparatus for receiving the bundles from the conveying means and picking up the paper sheets one by one from the bundles, to inspect the paper sheets, said inspecting apparatus including a take-in unit for taking in a bundle transferred along the insertion conveyor, and said conveying means having a storage portion for receiving and stacking a bundle which fails to be taken in by the take-in unit.

12. A system for processing paper sheets, comprising:
an input portion on which a predetermined number of bundles are placed, each bundle being prepared by banding a predetermined number of packs, and each pack being prepared by banding a predetermined number of paper sheets;
take-out means for taking out the bundles placed on the input portion one by one;
insertion side conveying means for receiving the bundles from the take-out means and conveying the bundles in a predetermined direction;
an inspecting apparatus for receiving the bundle from the insertion side conveying means, cutting and removing strips binding the bundle and strips binding the packs, picking up paper sheets one by one from the bundle, to inspect the paper sheets, banding the predetermined number of inspected paper sheets into a pack, banding the predetermined number of the packs to form a bundle, and discharging the inspected bundle;
reception side conveying means for receiving the discharged bundle and conveying the bundle in a predetermined direction;
a stacking portion for stacking a predetermined number of inspected bundles thereon; and
take-in means for receiving the inspected bundles from the reception side conveying means and stacking the inspected bundles on the stacking portion.

13. A system according to claim 12, wherein said inspecting apparatus includes a take-in unit for taking in a bundle from the insertion side conveying means, first cutting means for cutting strips binding the taken-in bundle, second cutting means for cutting strips binding the packs, a pickup device for picking up paper sheets one by one from the bundle whose strips have been cut, first detection means for detecting damage to and authenticity of the picked-up paper sheets, second detection means for detecting an uninspectable state and an inspectable state with regard to the paper sheets, a first sorter for sorting the paper sheets into uninspectable and counterfeited paper sheets and remaining paper sheets, based on the detection results from the first and second detection means, a first stacking device for stacking the uninspectable and counterfeited paper sheets sorted by the first sorter, a second sorter for sorting the remaining paper sheets into usable and unusable paper sheets, based on the detection result from the first detection means, a second stacking device for stacking the usable paper sheets sorted by the second sorter, and a third stacking device for stacking the unusable paper sheets sorted by the second sorter.

14. A system according to claim 12, wherein a plurality of said inspecting apparatuses are arranged along the insertion and reception side conveying means.

15. A system according to claim 14, wherein said take-out means includes a counter for counting the number of packs of a bundle taken out from the input portion, and rejecting means for rejecting a bundle having a number of packs other than the predetermined number, in accordance with a count result from the counter.

16. A system according to claim 15, wherein said counter has a scanner for counting the number of strips of the packs.

17. A system according to claim 15, wherein said rejecting means has a storage portion for storing the rejected bundle.

18. A system according to claim 12, wherein said take-in means includes a take-in conveyor for conveying a bundle from the reception side conveying means to a portion adjacent to the stacking portion, sealing means for sealing a predetermined item on the bundle conveyed by the take-in conveyor, turning means for receiving the bundle conveyed by the take-in conveyor and turning the bundle toward a predetermined direction, and moving means for moving the turned bundle to the stacking portion.

19. A system according to claim 12, wherein said stacking portion includes a plurality of horizontal shelves each capable of holding a predetermined number of bundles, and a drive mechanism for moving the shelves along a loop-like path in a horizontal state.

20. A system according to claim 12, wherein said stacking portion is arranged adjacent to the input portion.

21. A system according to claim 12, wherein said insertion side conveying means includes an insertion conveyor for conveying the bundle from the take-out means to the inspecting apparatus, said reception side conveying means has a reception conveyor, arranged adjacent to the insertion conveyor, for conveying the bundle from the inspecting apparatus to the take-in means, and said insertion and reception side conveying means have a common housing storing the insertion and reception conveyors.

22. A system according to claim 21, wherein said insertion and reception conveyors are arranged parallel to and vertically separated from each other.

23. A system for processing paper sheets, comprising:
an inspecting apparatus for receiving a bundle which is prepared by banding a predetermined number of packs, each pack being prepared by banding a predetermined number of paper sheets, cutting and removing strips binding the bundle and strips binding the packs, picking up paper sheets one by one from the bundle, to inspect the paper sheets, banding the predetermined number of inspected paper sheets into a pack, banding the predetermined number of the packs to form a bundle, and discharging the inspected bundle;

reception side conveying means for receiving the discharged bundle and conveying the bundle in a predetermined direction;

a stacking portion for stacking a predetermined number of inspected bundles thereon; and take-in means for receiving the inspected bundles from the reception side conveying means and stacking the inspected bundles on the stacking portion.

24. A system according to claim 23, wherein said take-in means includes a take-in conveyor for conveying a bundle from the reception side conveying means to a portion adjacent to the stacking portion, sealing means for sealing a predetermined item on the bundle conveyed by the take-in conveyor, turning means for receiving the bundle conveyed by the take-in conveyor and turning the bundle toward a predetermined direction, and moving means for moving the turned bundle to the stacking portion.

25. A system according to claim 23, wherein said stacking portion includes a plurality of horizontal shelves each capable of holding a predetermined number of bundles, and a drive mechanism for moving the shelves along a loop-like path in a horizontal state.

26. A system according to claim 23, wherein said inspecting apparatus includes first cutting means for cutting the strips banding the take-in bundle, second cutting means for cutting the strips banding the packs, a pick-up device for picking up paper sheets one by one from the bundle whose strips have been cut, first detection means for detecting damage to and authenticity of the pick-up paper sheets, second detection means for detecting an uninspectable state and an inspectable state with regard to the paper sheets, a first sorter for sorting the paper sheets into inspectable and counterfeited paper sheets and remaining paper sheets, based on the detection results from the first and second detection means, a first stacking device for stacking the uninspectable and counterfeited paper sheets sorted by the first sorter, a second sorter for sorting the remaining paper sheets into usable and unusable paper sheets, based on the detection result from the first detection means, a second stacking device for stacking the usable paper sheets sorted by the second sorter, and a third stacking device for stacking the unusable paper sheets sorted by the second sorter.

27. A system according to claim 23, wherein a plurality of said inspecting apparatuses are arranged along the reception side conveying means.

28. A system according to claim 23, wherein said take-in means includes a counter for counting the number of packs of a bundle taken in from the reception side conveying means, and rejecting means for rejecting a bundle having a number of packs other than said predetermined number, in accordance with a count result from the counter.

29. A system according to claim 28, wherein said counter has a scanner for counting the number of strips of the packs.

30. A system according to claim 28, wherein said rejecting means has a storage portion for storing the rejected bundle.

* * * * *